F. HODGKINSON.
REDUCTION GEARING.
APPLICATION FILED FEB. 4, 1919.

1,357,932.

Patented Nov. 2, 1920.

INVENTOR.
Francis Hodgkinson
BY
his ATTORNEYS.

UNITED STATES PATENT OFFICE.

FRANCIS HODGKINSON, OF EDGEWOOD, PENNSYLVANIA, ASSIGNOR TO THE WESTINGHOUSE GEAR & DYNAMOMETER COMPANY, A CORPORATION OF PENNSYLVANIA.

REDUCTION-GEARING.

1,357,932.     Specification of Letters Patent.     Patented Nov. 2, 1920.

Original application filed June 16, 1916, Serial No. 103,993. Divided and this application filed February 4, 1919. Serial No. 274,974.

*To all whom it may concern:*

Be it known that I, FRANCIS HODGKINSON, a citizen of the United States, and a resident of Edgewood, in the county of Allegheny and State of Pennsylvania, have made a new and useful Invention in Reduction-Gearing, (which is a division of application, Serial No. 103,993, filed June 16, 1916,) of which the following is a specification.

An object of this invention is to produce a transmission gearing employing a plurality of gear trains and in which the gears are so combined and arranged that the organized gearing is more compact, shorter axially of the gears and lighter than similar gearing capable of transmitting the same power and of accomplishing the same speed transformation.

A further object is to produce a multiple reduction gearing capable of transmitting large powers in which the separate gears are so combined and arranged as to obtain a more uniform distribution of stresses and strains than has heretofore been obtained in gears of the same speed ratio and power, and in which means are employed for compensating for deflection or distortion of the gears or gear carrying members forming a part of the gearing.

The gears of a power transmission gearing are liable to and do distort. The distortion may be either torsional or a transverse deflection and is more marked in relatively long gears and gear carrying members.

A further object of the invention is therefore to produce a reduction gearing capable of transmitting large powers and of accomplishing relatively great speed transformations in which means are employed for minimizing the cross bending or transverse deflection of the relatively long gears or gear carrying members.

In reduction gearing designed to transmit large powers it is impossible to wholly eliminate the torsional deflection of the pinions and relatively long gear carrying members and to maintain the weight and the size of the gearing within reasonable limits. The torsional deflection of a pinion results in an unequal distribution of tooth pressure throughout the length of the intermeshing teeth because the larger gears are inherently more rigid than the pinions and are therefore incapable of yielding in such a way as to compensate or even partially compensate for the deflection of the pinion.

In United States Patent No. 946,455, issued to G. W. Melville and J. H. Macalpine, a reduction gearing is shown in which one gear of the intermeshing pair is so mounted that its axis is capable of occupying different angular positions with relation to the axis of the other gear and of thereby compensating for deflection or distortion of the gear or the gear teeth, whether the deflection or distortion is occasioned by cross-bending or torsional deflection of the gear.

A specific object of my invention is to produce a double reduction gearing in which the speed transformation is accomplished in two steps and in which the large gear of one pair of intermeshing gears is formed integrally with, or otherwise operatively connected to the small gear of the other intermeshing pair and is capable of occupying different angular positions with relation to the axis of the main driven gear for the purpose of compensating for distortion of the gears or for slight inaccuracies in workmanship.

This, together with the previously enumerated objects, and other objects, to be made more apparent throughout the further description of the invention, are accomplished by means of apparatus embodying the features herein described and illustrated.

In the drawings: Figure 1 is a plan view of a reduction gearing embodying my invention.

Figure 1:
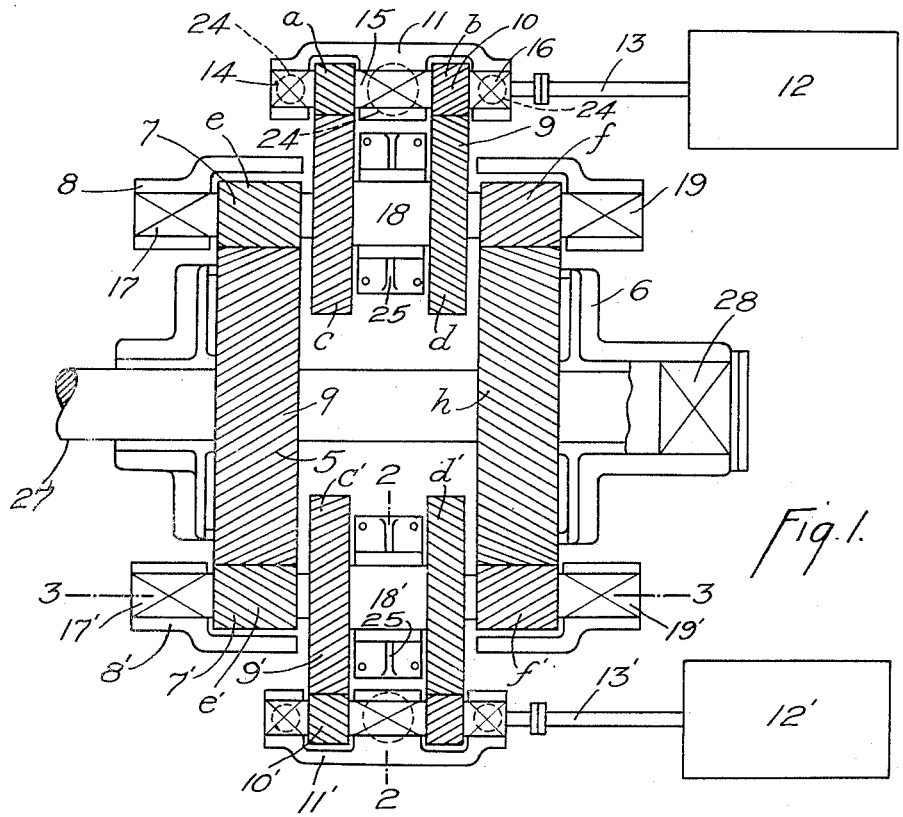
Figures 2, 3:
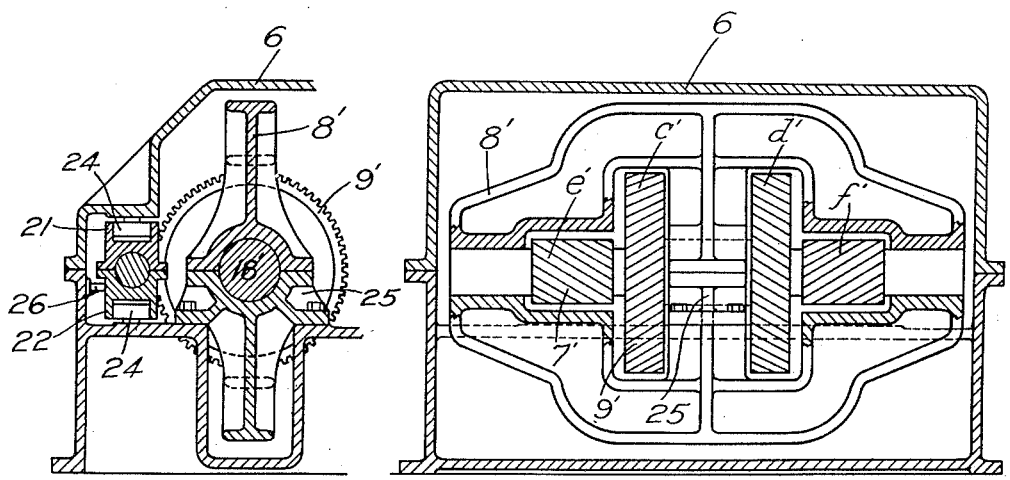
Fig. 2 is a fragmental vertical transverse sectional view along the line 2—2 of Fig. 1.
Fig. 3 is a transverse vertical sectional view along the line 3—3 of Fig. 1.

In the illustrated embodiment of my invention, I have disclosed a main gear which is adapted to be operatively connected to the driven agent. Meshing with this main gear is a pinion which may be termed the intermediate pinion and is shown integrally formed with a larger gear which may be termed the intermediate gear wheel. This gear wheel meshes with the main driving gear or pinion which, as shown, is operatively connected to the driving agent. The intermediate pinion and the intermediate gear wheel comprise an intermediate gear member which is so mounted that it is capable of occupying different angular positions with relation to the axis of the main gear for the purpose of compensating for the distortions of the gear or the gear member and for slight inaccuracies in workmanship. The driving pinion is also so mounted that it is capable of angular motion with relation to the normal position of its axis for the purpose of following the angular movements of the intermediate gear member and also for the purpose of compensating for its own distortion.

For convenience of description, I have described my invention as a double reduction gear, but I desire it to be understood that I do not wish to thereby limit the invention to reduction gearing, since those skilled in the art will readily appreciate that the invention is equally applicable to transmission gearing in which the driven agent rotates at a speed greater than that of the driving agent. It will be equally apparent to those skilled in the art that the illustrated embodiment of my invention may be employed in accomplishing such a speed transformation.

In the drawings I have illustrated a reduction gearing of the type in which power from more than one driving agent is transmitted to the driven gear. It will, however, be understood that certain, and possibly the principal features of the invention are applicable to and may be embodied in double reduction gearing receiving power from a single driving agent. As shown, the reduction gearing includes a main driven gear 5 which is journaled in a substantially rigid frame 6 and which may be operatively coupled to a driven agent such as a propeller shaft. The gear teeth of the gear 5 may be spiral or herringbone teeth and as shown are formed in two sets which are spaced apart. Two intermediate pinions 7 and 7' mesh with the gear 5. The teeth of these pinions are formed in two sets which are spaced longitudinally of the intermediate member to correspond to the spacing of the sets of teeth of the gear 5. Each intermediate pinion forms a part of an intermediate gear member and is journaled in a floating frame 8. For convenience of description I have applied the reference character 8' to the floating frame in which the pinion 7' is mounted. Each intermediate gear member includes an intermediate gear wheel which may be formed integrally with the pinion or which may be otherwise operatively connected to it. As shown, the pinion 7 is integrally formed with a gear wheel 9, and the pinion 7' is integrally formed with a gear wheel 9'. Each intermediate gear wheel meshes with and is driven by a separate pinion. The driving pinion 10 of the gear wheel 9 is shown journaled in a floating frame 11 and is operatively connected to a driving agent 12 by means of a connection such as a flexible shaft 13. The intermediate gear wheel 9' meshes with and is driven by a driving pinion 10', which is operatively coupled to the driving agent 12' by means of a flexible shaft 13', and is journaled in a floating frame 11'.

For the purpose of equally distributing the stresses and strains between the different sets of teeth of each gear and also for the purpose of minimizing the extent of the angular motion of the driving pinions and the intermediate gear members, I have so formed and so arranged each gear that the gearing is bilaterally symmetrical with relation to its transverse axis which extends at right angles to the axis of the main gear 5, midway between the sets of teeth of that gear. With this arrangement the stresses are not only equally distributed between the two sets of teeth of each gear but provision is also made for minimizing the cross bending deflection of the pinions and gear members, since the spacing of the sets of gear teeth makes it possible to employ intermediate bearings for the pinions and the intermediate gear members.

As shown, the pinion 10 is provided with three bearings 14, 15 and 16, all of which are mounted on the floating frame 11. The bearing 15 is located between the two sets of gear teeth $a$ and $b$ so that the pinion is supported by a bearing at a point intermediate its ends as well as at points adjacent to its ends. The intermediate gear member is also provided with three bearings 17, 18 and 19, all of which are mounted on the floating frame 8. The bearing 18 is located midway between the ends of the gear member, whereas the other two bearings are located at or near the ends of the member. To accommodate this arrangement of bearings both the intermediate pinion and the intermediate gear wheel are in effect formed in two parts. As shown, one set of gear teeth $c$ of the gear wheel 9 is located on one side of the bearing 18 and the other set $d$ is located on the other side of the bearing. One set $e$ of the gear teeth of the intermediate pinion 7 is located on one side of the gear wheel 9, and the other set $f$ is located on the other side of the gear wheel, both being located between the end bearings. With this arrangement the two sets $c$ and $d$ of teeth of the wheel 9 extend into the space between the two sets $g$ and $h$ of gear teeth of the main gear 5. The arrangement of the sets of gear teeth and bearings of the intermediate pinion 7', gear wheel 9' and driving pinion 11' correspond to the arrangement above described.

The illustrated mounting means of each of the frames 11, 11' consists of oppositely disposed cylinders 21 and 22 located above and below the pinion and formed integrally with or secured to the floating frame. These cylinders receive fluid or liquid under pressure from any suitable source and each is shown provided with an operating plunger or piston 24 which engages the main or stationary frame 6 of the gearing in such a way as to permit the floating frame to assume different angular positions with relation to the normal position of the axis of the pinion. The supply of fluid under pressure delivered to the cylinders 21 and 22 may be controlled as illustrated in Patent No. 1,136,189 to George Westinghouse, and the cylinder construction illustrated may be replaced by the arrangement of cylinders and pistons illustrated in Westinghouse Patent No. 1,088,387. With the arrangement of cylinders and pistons illustrated or above described, each driving pinion will be capable of tilting about a pivotal point substantially midway between its ends, since the supporting pistons are located symmetrically with relation to the sets of gear teeth of the pinion.

The floating frames in which the intermediate gear carrying members are journaled are illustrated as being mounted on the frame 6 by means of an I-beam construction, the flexible web 25 of the I-beam being so located that the pivot point of each intermediate gear member or of its mounting frame is located midway between the ends of the gear member so that both the gear member and the driving pinion, with which it coöperates, turn about the same axis in moving to different angular positions in planes perpendicular to the plane defined by the normal positions of their axes.

It will, of course, be understood that the floating frame 8 or 8' of each intermeshing gear member may be mounted on the main or stationary frame 6 by means of a cylinder and piston construction similar to that described in connection with the driving pinion 10, or it may be mounted on the frame 6 in a manner substantially as illustrated in connection with the mounting of the pinion in Westinghouse Patent No. 1,088,387. It will be apparent that the angular motion of each gear carrying member 19 may be limited to motion in one plane by the struts 26 shown in Fig. 4 or by struts similar to the struts 46 of Melville et al. Patent No. 946,455. The main shaft of the gearing, that is the shaft 27, on which the main gear wheel 5 is mounted may be provided with a thrust bearing 28 for the purpose of taking up longitudinal thrusts transmitted to the shaft 27.

Distortion of an intermediate gear member will cause the gear member to move to an angular position such that the tooth pressure between the intermeshing gear teeth will be automatically distributed so as to equalize the tooth pressure throughout the length of each of the intermeshing teeth. This angular movement of the intermediate member, or a distortion of the intermediate member will distort the teeth of the intermediate gear wheels, or will change the relative positions of the two sets of teeth and will cause the coöperating driving pinion to move to an angular position and to thereby compensate for the change in position of the intermediate gear carrying member or for the distortion of that member. The same action will result from a distortion of either driving pinion. From the above it will be apparent that the driving gears and the intermediate gear members will automatically assume different angular positions, with relation to the normal position of their axes, and will thereby compensate for any distortion or deflection which may occur.

While I have described and illustrated a single embodiment of my invention, it will be apparent to those skilled in the art that various changes, modifications, additions and omissions may be made in the apparatus illustrated without departing from the spirit and scope of the invention as set forth by the appended claims.

What I claim is:

1. In a transmission gearing, a driving gear having two sets of teeth spaced apart axially of the gear, a driven gear having two sets of teeth spaced apart axially of the gear, an intermediate gear member comprising an intermediate gear wheel, having two sets of teeth spaced to conform to the spacing of the sets of said driving gear and meshing with the teeth of said driving gear, and an intermediate pinion having two sets of teeth located on opposite sides of said gear wheel and meshing with the teeth of said driven gear, means for mounting said intermediate gear member so that it is capable of moving to different angular positions with relation to the axis, of the driven gear.

2. In a transmission gearing, a driving gear having two sets of teeth, a driven gear having two sets of teeth, an intermediate gear member comprising an intermediate gear wheel having two sets of teeth and meshing with the teeth of said driving gear and an intermediate pinion having two sets of teeth meshing with the teeth of said driven gear, the teeth of said intermediate pinion and gear wheel being symmetrically arranged with relation to the transverse axis of said gearing, and tiltable supporting means for the driving pinion and the intermediate gear member whereby the axes of the driving pinion and the intermediate gear member may move angularly.

3. In a transmission gearing, a driving gear, a driven gear, an intermediate gear member comprising an intermediate pinion meshing with said driven gear and an intermediate gear wheel meshing with said driving gear, a floating frame in which said intermediate gear member is journaled, and means for mounting said frame such that the axis of the gear member is capable of moving to different angular positions about a pivot point located midway between its ends.

4. In a transmission gearing, a driving pinion, a driven gear, an intermediate gear member comprising a two part intermediate pinion meshing with the driven gear and a two part intermediate gear wheel meshing with the driving pinion, and mounting means for said intermediate member such that said member is capable of moving to different angular positions about a pivot point located substantially midway between its ends, said two part gear wheel and pinion being arranged symmetrically with relation to said pivot point.

5. In a transmission gearing, a driving pinion, a driven gear, an intermediate gear member, for transmitting power from the pinion to the gear, and mounting means for said member and said pinion whereby both are capable of tilting to accomplish a uniform distribution of tooth pressure, the pivot point about which said pinion tilts and the pivot point about which said intermediate gear member tilts defining a line which is substantially at right angles to the axis of the driven gear.

6. In a double reduction gearing, a two part driving gear, a two part driven gear, resilient supporting means for the driving gear, an intermediate gear member including a two part intermediate gear meshing with the driving gear and a gear on each side thereof meshing with the driven gear, a resiliently supported frame in which the gear member is mounted, and supporting means for said frame located at a point intermediate the two parts of the two part intermediate gear.

7. In a double reduction gearing, a driven gear, a driving gear and an intermediate gear member meshing with both said gears, said member and said driving gear both movable to angular positions in planes perpendicular to the plane defined by the normal positions of their axes, the pivot points about which said member and said driving gear move defining a line substantially perpendicular to the normal position of the axes of the gears.

8. In a double reduction gearing, a driven gear, two driving gears, a separate intermediate gear member for transmitting power from each driving gear to said driven gear, a separate floating frame in which each gear member is journaled, and resilient support for each frame located midway between the ends of the member journaled therein.

9. In a double reduction gearing, a two part driven gear, two two part driving gears, a separate intermediate gear member for transmitting power from each driving gear to the driven gear, a separate floating frame in which each member is located, and supporting means for each frame so arranged that each frame is capable of tilting about a point intermediate its ends for the purpose of obtaining a uniform distribution of pressure along the intermeshing teeth, each intermediate gear member comprising a two part gear wheel meshing with the driving gear and a two part pinion meshing with the driven gear, bearings for each gear member located at the ends thereof and at a point intermediate the ends, one of the parts of the pinion and of the gear wheel being located on each side of said intermediate bearing.

10. In a double reduction gearing, a pinion, a gear, an intermediate gear member transmitting power from said pinion to said gear, a floating frame in which said member is journaled and a fluid supported frame in which said pinion is journaled.

11. In a reduction gear, the combination of a driving pinion member having pinion portions, bearings for the pinion member, means for supporting the bearings whereby the pinion member is capable of tilting motion about a point intermediate the pinion portions thereof, a driven member having gear portions, an intermediate member having pinion portions meshing with the gear portions of the driven member and gear portions meshing with the pinion portions of the pinion member, a frame having bearings for the intermediate member, and flexible means for supporting the frame at an intermediate point whereby the intermediate member may tilt about a transverse axis.

12. In a reduction gear, the combination of a driven pinion member having pinion portions, bearings for the pinion member, means for supporting the bearings whereby the pinion member is capable of tilting motion about a point intermediate the pinion portions thereof, a driven member having gear portions, an intermediate member having pinion portions meshing with the gear portions of the driven member and pinion portions meshing with the pinion portions of the pinion member, a two-part frame having bearings for supporting the intermediate gear member, and transverse I-beam portions carried by the lower part of the frame member and disposed transversely relatively thereto whereby the intermediate member is capable of tilting motion about a transverse axis.

In testimony whereof, I have hereunto subscribed my name this 31st day of January, 1919.

FRANCIS HODGKINSON.